United States Patent
Posamentier

(10) Patent No.: US 7,382,254 B2
(45) Date of Patent: Jun. 3, 2008

(54) STORAGE MEDIUM HAVING RFID TAG AND METHODS FOR USING SAME

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 11/003,477

(22) Filed: Dec. 3, 2004

(65) Prior Publication Data

US 2006/0132309 A1 Jun. 22, 2006

(51) Int. Cl.
*G08B 13/14* (2006.01)

(52) U.S. Cl. .................. 340/572.1; 340/572.6

(58) Field of Classification Search ............. 340/572.1, 340/572.3, 572.6, 572.8
See application file for complete search history.

(56) References Cited

U.S. PATENT DOCUMENTS

| | | | |
|---|---|---|---|
| 6,023,763 A | | 2/2000 | Grumstrup et al. |
| 6,097,291 A * | | 8/2000 | Tsai et al. ................. 340/572.6 |
| 6,222,453 B1 * | | 4/2001 | Joyce ....................... 340/572.8 |
| 6,693,542 B2 * | | 2/2004 | Hasegawa ................ 340/572.8 |
| 6,806,842 B2 * | | 10/2004 | King et al. ............... 340/572.8 |
| 6,879,264 B2 * | | 4/2005 | Hidaka et al. ........... 340/572.1 |
| 6,946,963 B2 * | | 9/2005 | Sellers et al. ............ 340/572.5 |
| 6,947,371 B2 * | | 9/2005 | Bigley ..................... 340/572.6 |
| 7,053,773 B2 * | | 5/2006 | McGarry et al. ........ 340/572.1 |
| 7,129,840 B2 * | | 10/2006 | Hull et al. ............... 340/572.1 |
| 7,180,422 B2 * | | 2/2007 | Milenkovic et al. ..... 340/572.4 |
| 7,245,213 B1 * | | 7/2007 | Esterberg et al. ........ 340/572.1 |
| 2003/0233547 A1 | | 12/2003 | Gaston et al. |
| 2004/0251541 A1 | | 12/2004 | Arneson et al. |
| 2005/0086419 A1 * | | 4/2005 | Neble et al. ................ 711/100 |

FOREIGN PATENT DOCUMENTS

| | | |
|---|---|---|
| EP | 0809245 A2 | 11/1997 |
| EP | 0849734 A2 | 6/1998 |
| EP | 0919929 A1 | 6/1999 |
| EP | 1553576 A1 | 7/2005 |
| WO | WO-0023994 A1 | 4/2000 |
| WO | WO-0106507 A1 | 1/2001 |
| WO | WO-03092173 A2 | 11/2003 |
| WO | WO-2004015702 A1 | 2/2004 |
| WO | WO-2006060238 A2 | 6/2006 |
| WO | WO-2006060238 A3 | 6/2006 |

* cited by examiner

*Primary Examiner*—John Tweel, Jr.
(74) *Attorney, Agent, or Firm*—The Law Offices of John C. Scott; John C. Scott

(57) ABSTRACT

A digital storage medium (e.g., a CDROM, a DVD, a tape, etc.) has an integrated RFID tag to store information for use in controlling access to the data stored on the digital storage medium.

24 Claims, 6 Drawing Sheets

STORAGE MEDIUM HAVING RFID TAG AND METHODS FOR USING SAME

TECHNICAL FIELD

The invention relates generally to digital storage media and, more particularly, to techniques and structures for providing security, authentication, and/or access control for digital storage media.

BACKGROUND OF THE INVENTION

Digital storage media, such as compact disk read only memories (CDROMs) and digital versatile disks (DVDs), may be used in a variety of applications including, for example, commercial software distribution, video and/or audio content distribution, data sharing and archival, and/or others. Often, the content stored on such digital storage media is restricted to use by designated parties (e.g., licensed users, business associates, purchasers, etc.) and is not intended for general use by the public. Methods have been devised in the past for protecting such content from unauthorized use, but many of these methods have been inadequate. Methods and structures are therefore needed for improving and/or simplifying the protection of such digital content.

DETAILED DESCRIPTION

Figure 1:
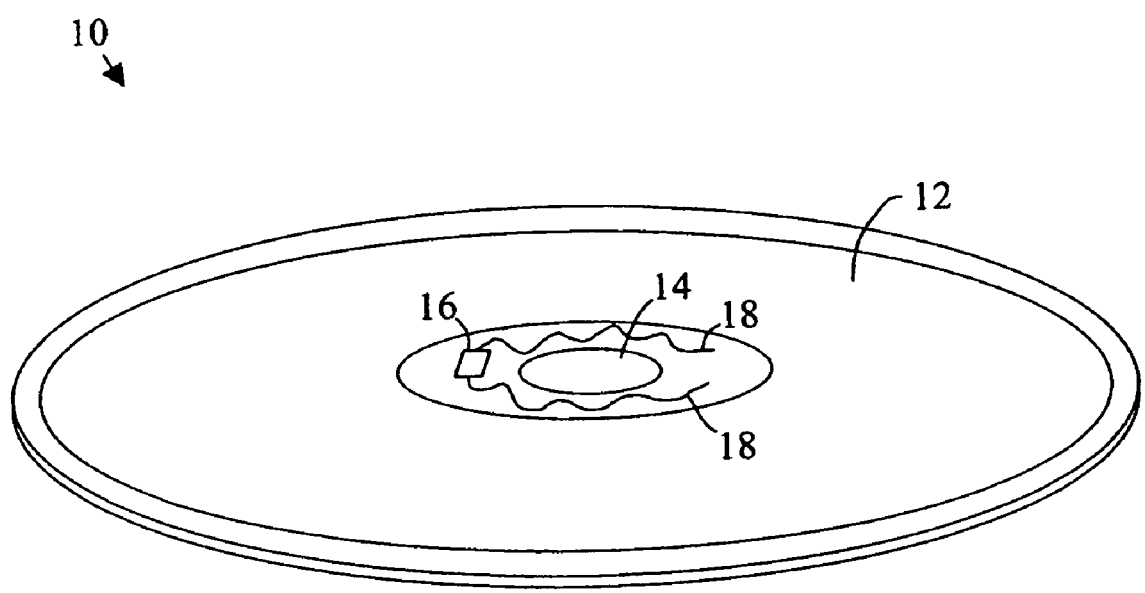
FIG. 1 is a diagram illustrating a data storage disk in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating a data storage disk 10 in accordance with an embodiment of the present invention. As shown, the data storage disk 10 includes: a data recording region 12, a disk center hole 14, a radio frequency identification (RFID) tag 16, and an RFID antenna 18. The data recording region 12 is operative for storing digital data on the data storage disk 10. In at least one embodiment, optical data storage techniques are used. Other data storage techniques may alternatively be used (e.g., magnetic storage, etc.). Any type of data may be stored in the data recording region 12 including, for example, audio data, video data, computer data, and/or others. The center hole 14 allows the disk to be mounted on a center spindle structure within a digital storage drive or player to allow the disk to be rotated during disk access operations. As will be described in greater detail, the RFID tag 16 is used to store information that may be used for security, access control, and/or authentication purposes for the content stored within the data recording region 12. The RFID antenna 18 facilitates the reception and transmission of radio frequency (RF) signals by/from the RFID tag 16. Any of a number of different low profile antenna types may be used for the RFID antenna 18 including, for example, a dipole, a loop, a patch, and/or others. The data storage disk 10 may represent a modified compact disk read only memory (CDROM), digital versatile disk (DVD, DVD-R, DVD+R, DVD-RW, DVD+RW, DVD-RAM, etc.), minidisks, and/or other types of disk storage media. The data storage disk 10 may also represent new and future types of storage media (e.g., Blu-ray disks, etc.).

In the illustrated embodiment, the RFID tag 16 is mounted on the data storage disk 10 in an area between the data recording region 12 and the disk center hole 14. Other locations may alternatively be used. In optical recording applications, a metallic layer (typically aluminum or an aluminum alloy) is normally deposited on one side of a polymer disk to act as a reflective layer for an optical beam reading the disk. In FIG. 1, this metallic layer would cover at least the data recording region 12. In at least one embodiment of the invention, the RFID antenna 18 is deposited on the disk 10 at the same time as the reflective metallic layer (as part of the same deposition process). The RFID tag 16 may then be connected to the RFID antenna traces by, for example, flip chip bonding, wire bonding, or some other bonding technique. Other techniques for depositing the antenna traces may alternatively be used. In at least one embodiment, the antenna is an integral part of the RFID tag 16 itself.

Figure 2:
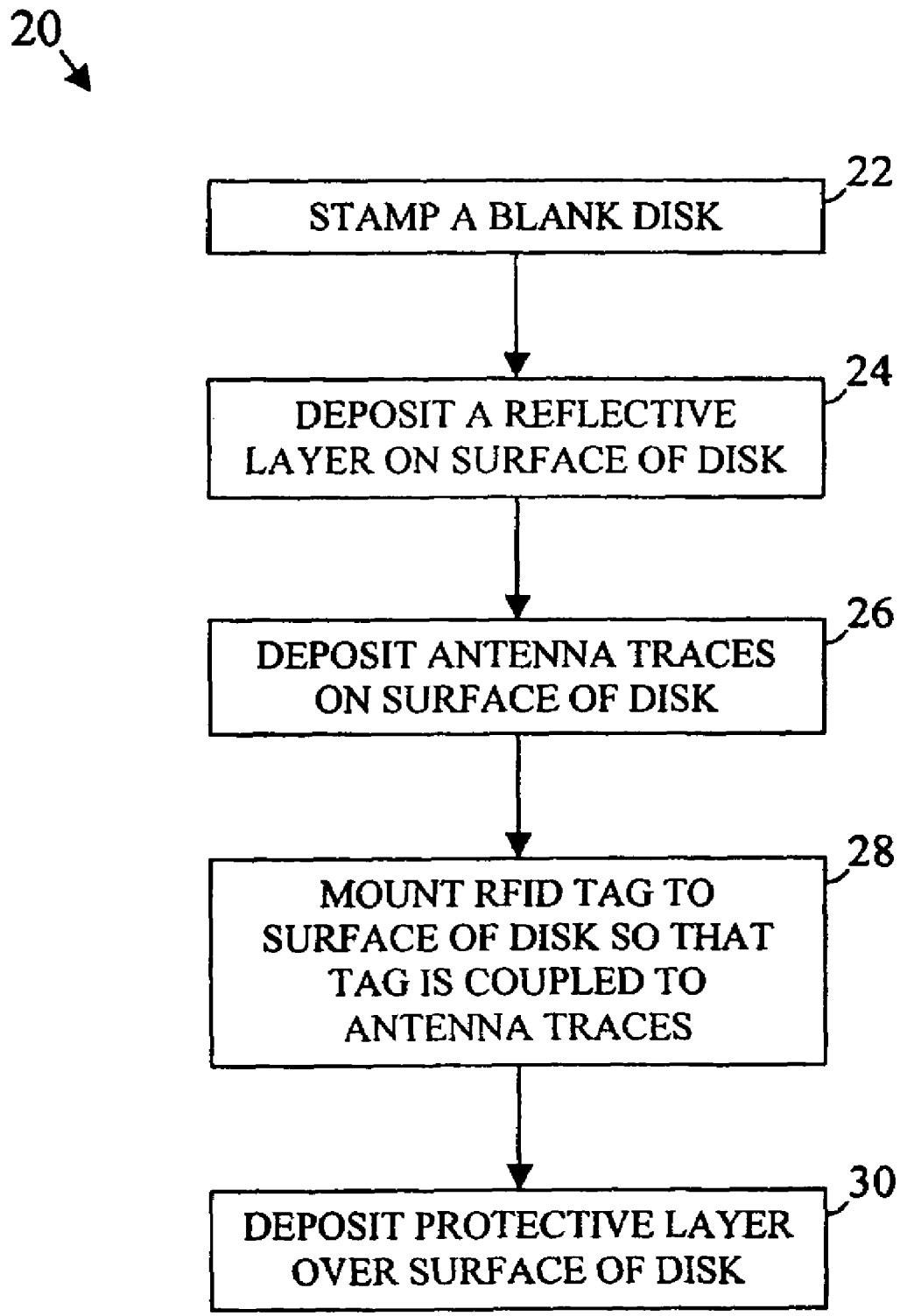
FIG. 2 is a flowchart illustrating an example method for use in fabricating a data storage disk in accordance with an embodiment of the present invention.

FIG. 2 is a flowchart illustrating an example method 20 for use in fabricating a data storage disk in accordance with an embodiment of the present invention. A blank polymer disk is first stamped to form pits in a surface thereof that are representative of data (block 22). In at least one implementation, the disk is made out of polycarbonate or a similar material (although other types of material may alternatively be used). After stamping, a metallic layer is deposited on the pitted surface of the disk (using, for example, sputtering) to act as a reflective layer to facilitate the reading of the data (i.e., the pits) using a laser (block 24). The RFID antenna traces are also deposited on the surface of the disk (block 26). As described above, in at least one embodiment, the antenna traces and the reflective layer are deposited concurrently as part of the same deposition process. In other embodiments, the antenna traces and the reflective layer are deposited separately. The RFID tag is next mounted on the surface of the disk so that the tag is electrically coupled to the antenna traces (block 28). A protective coating may then be applied over the pitted surface to cover the metallic layer and the RFID tag (block 30). In at least one embodiment, a lacquer coating is used as the protective layer. Other techniques for fabricating a digital storage medium in accordance with the present invention may alternatively be used.

Referring back to FIG. 1, in a typical scenario, an RFID reader will be used to read information from the RFID tag 16 of the disk 10 before (or while) disk access is attempted. The information read from the tag may then be used as part of the disk access process. To read the RFID tag 16, an interrogation signal will typically be transmitted by the reader in a vicinity of the tag 16. Upon receipt of the interrogation signal, the tag 16 may transmit information stored therein to the reader. In at least one embodiment, the RFID tag 16 is a passive tag that derives operational power from the interrogation signal itself. That is, the tag does not include an internal power source (e.g., a battery). In other embodiments, active RFID tags are used. In one possible implementation, an RFID reader may be made part of the data drive or player that is to access the disk (e.g., part of a CDROM drive, a DVD drive, a Blu-ray drive, etc.). In other implementations, the RFID reader may be located elsewhere within the reading system, separate from the drive, but close enough to read the RFID tag 16 by interrogation.

Figure 3:
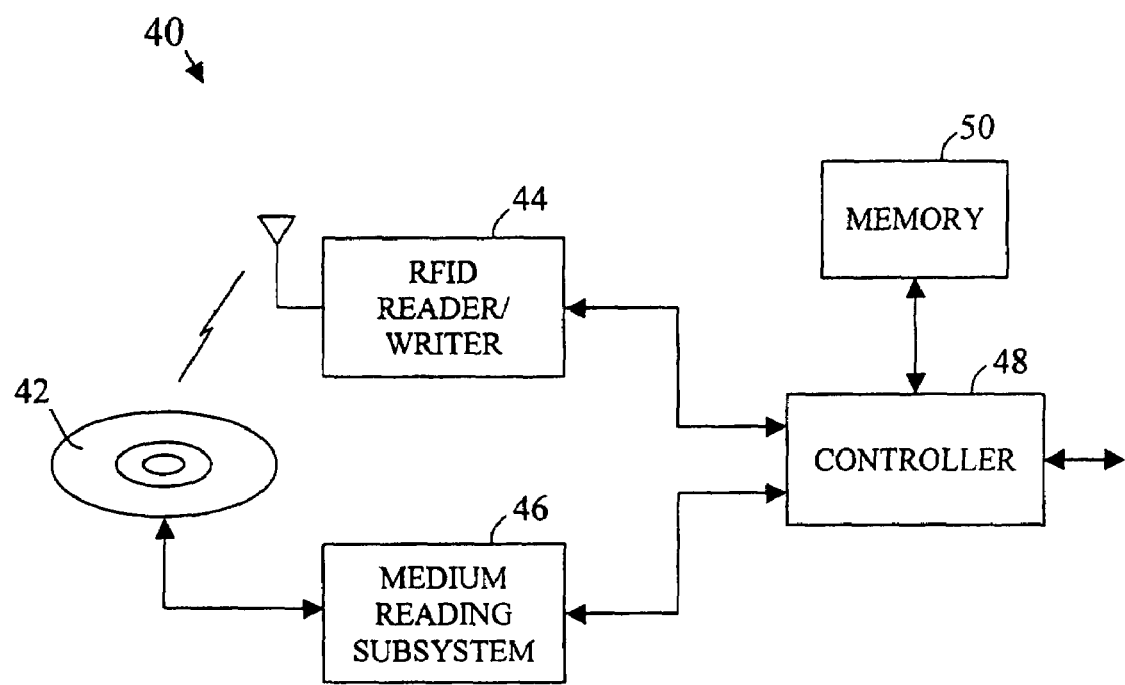
FIG. 3 is a block diagram illustrating an example system for use in accessing a data storage medium in accordance with an embodiment of the present invention.

FIG. 3 is a block diagram illustrating an example system 40 for use in accessing a data storage disk 42 in accordance with an embodiment of the present invention. The system 40 may represent any type of system that needs to access data stored on a digital storage medium including, for example, a CDROM drive; a DVD drive; a Blu-ray drive; a computer having a CDROM drive, a DVD drive, and/or a Blu-ray drive; a DVD video player; a CDROM audio player; a Blu-ray player, and/or others. As shown, the system 40 may include one or more of: an RFID reader/writer 44, a medium reading subsystem 46, a controller 48, and a memory 50. The medium reading subsystem 46 is operative for reading data from a data recording region of the data storage disk 42. This reading may be performed in a conventional fashion using, for example, optical techniques (e.g., a laser and detector approach), magnetic reading techniques (e.g., a read/write head, etc.), or other digital data reading techniques.

The RFID reader/writer 44 may be used to read information from an RFID tag associated with the data storage disk 42 and to deliver the information to the controller 48. The RFID reader/writer 44 may also be used to write information to the RFID tag associated with the data storage disk 42 under the control of the controller 48. In some applications, writing to the RFID tag may not be required. In such cases, the RFID reader/writer 44 may be replaced by an RFID reader that is not capable of writing to the tag. The controller 48 is operative for, among other things, using the information read from the RFID tag to perform security, access control, and/or authentication functions related to accessing the data stored on the data storage disk 42. The controller 48 may be implemented within one or more digital processing devices within the system 40 including, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The controller 48 may use the memory 50 to, among other things, temporarily store information during processing (e.g., store the information received from the RFID reader/writer 44, etc.).

In at least one embodiment of the present invention, an RFID tag associated with a digital storage disk is used to store a decryption key for use in decrypting the data stored on the disk. Before accessing the data on the disk, an RFID reader may be used to read the decryption key from the RFID tag. The decryption key may then be used to decrypt data read from the disk. Different keys may be stored on different disks to provide different levels of access for different end uses based on access rights. The RFID tag may also, or alternatively, store other configuration instructions that would be useful for media distribution and content control. For example, the RFID might include an instruction that the data on the corresponding medium may be played, but not copied (e.g., in the case of video or audio data). Other instructions may also (or alternatively) be stored.

In at least one implementation, a digital storage medium (e.g., a disk) having stored content is maintained in a "locked" mode prior to sale, using an associated RFID tag. At the time of sale, the digital storage medium may be "unlocked" by modifying the contents of the RFID tag so that the disk may be accessed by the purchaser. The process of "unlocking" the medium may be accomplished in a variety of different ways. In one approach, for example, the unlocking process at the point of sale (POS) may include simply writing a valid decryption code to the RFID tag. The medium may then be accessed as described previously. In another approach, a memory location within the RFID tag may be used to record the present status of the associated medium (e.g., a bit position to indicate a locked condition if a logic 1 is stored and an unlocked condition if a logic zero is stored, or vice versa). At the POS, the status of the medium may be changed to "unlocked" using an RFID writer. Other techniques for locking and unlocking a medium using an associated RFID tag may alternatively be used.

In at least one embodiment of the invention, an RFID tag associated with a digital storage medium is used as a check out time-limiter. For example, by prior agreement, the content of a digital storage medium may be accessible for only a predetermined amount of time. This may be the case, for example, if a DVD storing a movie is rented from a video rental establishment for a fixed number of days. In such a case, the time limit (e.g., an expiration date) may be written to the RFID tag associated with the digital storage medium. Before the digital storage medium is read, the date stored within the RFID tag may first be read and compared to a present date. If the date stored within the RFID tag is later than the present date, then access rights to the medium have expired and access will not be granted. With reference to FIG. 3, the date comparison may be performed within, for example, the controller 48 (although other locations may alternatively be used). After access rights have expired, the medium will need to be renewed, returned, or discarded.

In at least one implementation, the inventive structures are used to act as a software key and license tracker for commercial software distributed on the medium. When a piece of software is installed to a computer from a digital storage medium, a software key may be read from the corresponding RFID tag for use in accessing the medium. Information may then be written to the RFID tag indicating that the software has been installed to a computer. The ID of the computer may also be recorded to the RFID tag at this time. If the software license indicates that the software is only to be written to a single machine, then subsequent efforts to install the software to another machine will fail. That is, the other machine will read the RFID tag associated with the medium and determine that the software has already been installed and thus block the new installation. The computer would have to be pre-programmed to perform this function. The software may be permitted to be re-installed to the same machine to which it was originally installed (a finite or infinite number of times). In another example, an RFID tag may be programmed to permit the software stored on a corresponding medium to be installed on a predetermined number of machines, or in some other manner. In at least one embodiment, when software is de-installed from a computer, an RFID tag associated with a corresponding digital storage medium may be modified to remove the previously written installation state. In this manner, the software may now be installed on another machine without violating the license. A time limit may also be established for using the installed software that would require the digital storage medium (e.g., a disk) to be inserted to renew the license.

The use of an RFID tag on a digital storage medium as described above may also have advantages that are not directly related to security, authentication, and the like. For example, the RFID tag may be used as a bar code replacement. That is, instead of bar code scanning a digital storage medium at a point of sale (e.g., a music CDROM being purchased at a music store, etc.), the RFID tag associated with the digital storage medium may be read with an RFID reader. This will typically require that an appropriate RFID technology be selected (e.g., high frequency (HF), ultra high frequency (UHF), etc.) to achieve the read range necessary to act as a replacement for the bar code. This bar code replacement feature may also be used to provide inventory and shelf monitoring. The RFID tag associated with a digital storage medium may also be used as a theft detection device by, for example, providing RFID readers at store exits to detect RFID tags that have not been properly processed by a cashier during purchase (e.g., electronic article surveillance (EAS)). Again, an appropriate RFID technology must be selected to achieve the read range required to detect stolen items.

It should be appreciated that the above-described techniques may be practiced separately or in any combination for a digital storage medium. For example, in one implementation, an RFID tag associated with a storage medium may include only a decryption key. In another implementation, an RFID tag associated with a storage medium may include a decryption key and an expiration date, and so on. Furthermore, other types of information may also, or alternatively, be stored within an RFID tag associated with a digital storage medium in accordance with embodiments of the present invention. In the above discussion, a disk-shaped digital storage medium having an RFID tag is described. It should be appreciated that RFID tags may also be used in connection with other types of digital storage media to provide security, access control, and/or authentication functions in accordance with embodiments of the invention. For example, in some embodiments, the inventive principles are extended to non-disk passive digital storage media including tapes (e.g., mini-DV, DV, SD, Digital8, ADAT, DA88, DCC) and/or others.

Figure 4:
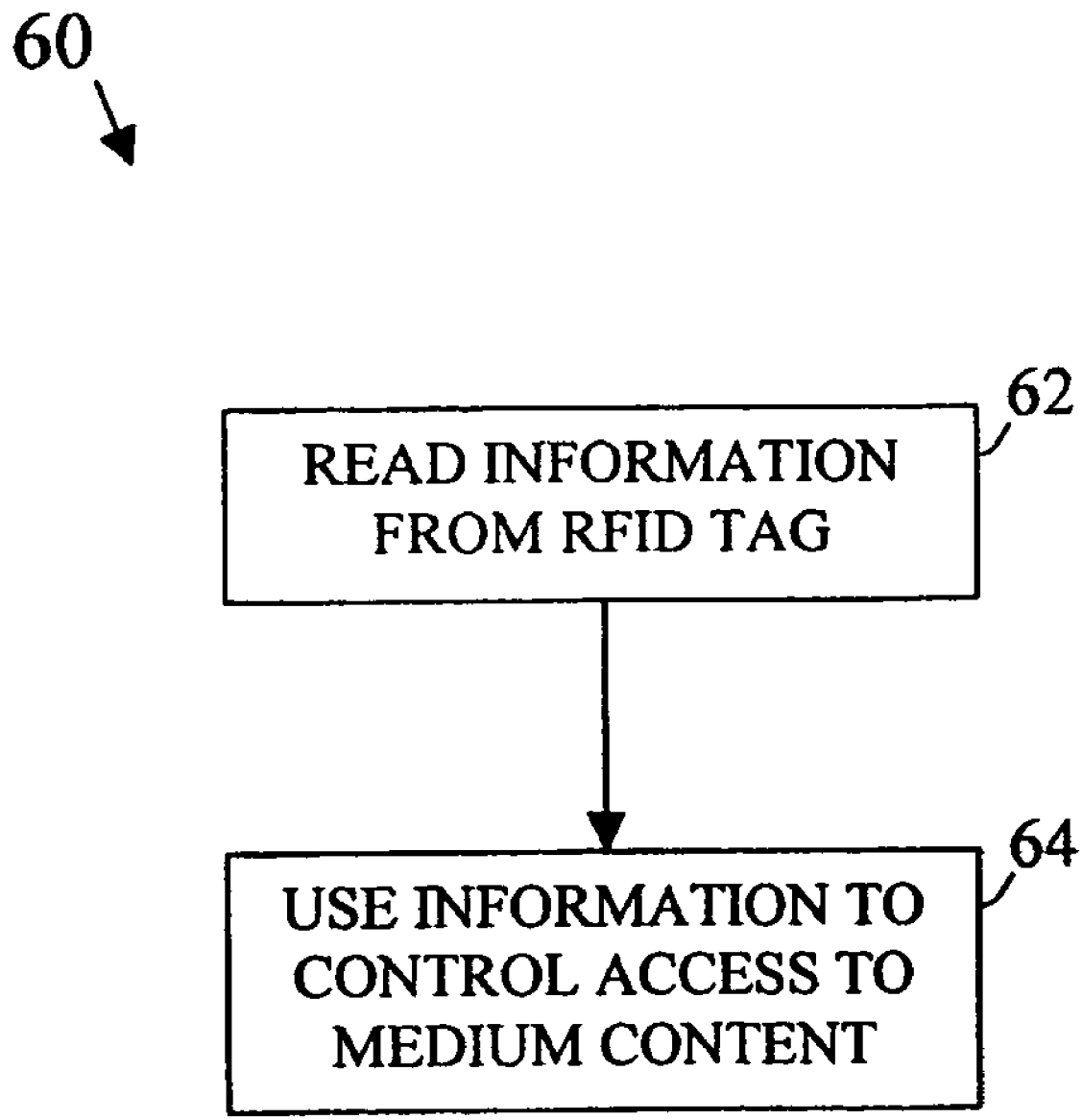
FIG. 4 is a flowchart illustrating an example method for use in accessing a digital storage medium in accordance with an embodiment of the present invention.

FIG. 4 is a flowchart illustrating an example method 60 for use in accessing a digital storage medium in accordance with an embodiment of the present invention. The method 60 is for use with a digital storage medium having an associated RFID tag. First, information is read from the RFID tag associated with the digital storage medium (block 62). The information may relate to, for example, security, access control, and/or authentication related functions involving the data stored on the storage medium. The information read from the RFID tag is then used to control access to the storage medium content in some fashion (block 64). For example, the information read from the tag may include a decryption key that can be used to decrypt data subsequently read from the digital data storage medium. As described previously, other types of information may additionally (or alternatively) be stored within the RFID tag.

Figure 5:
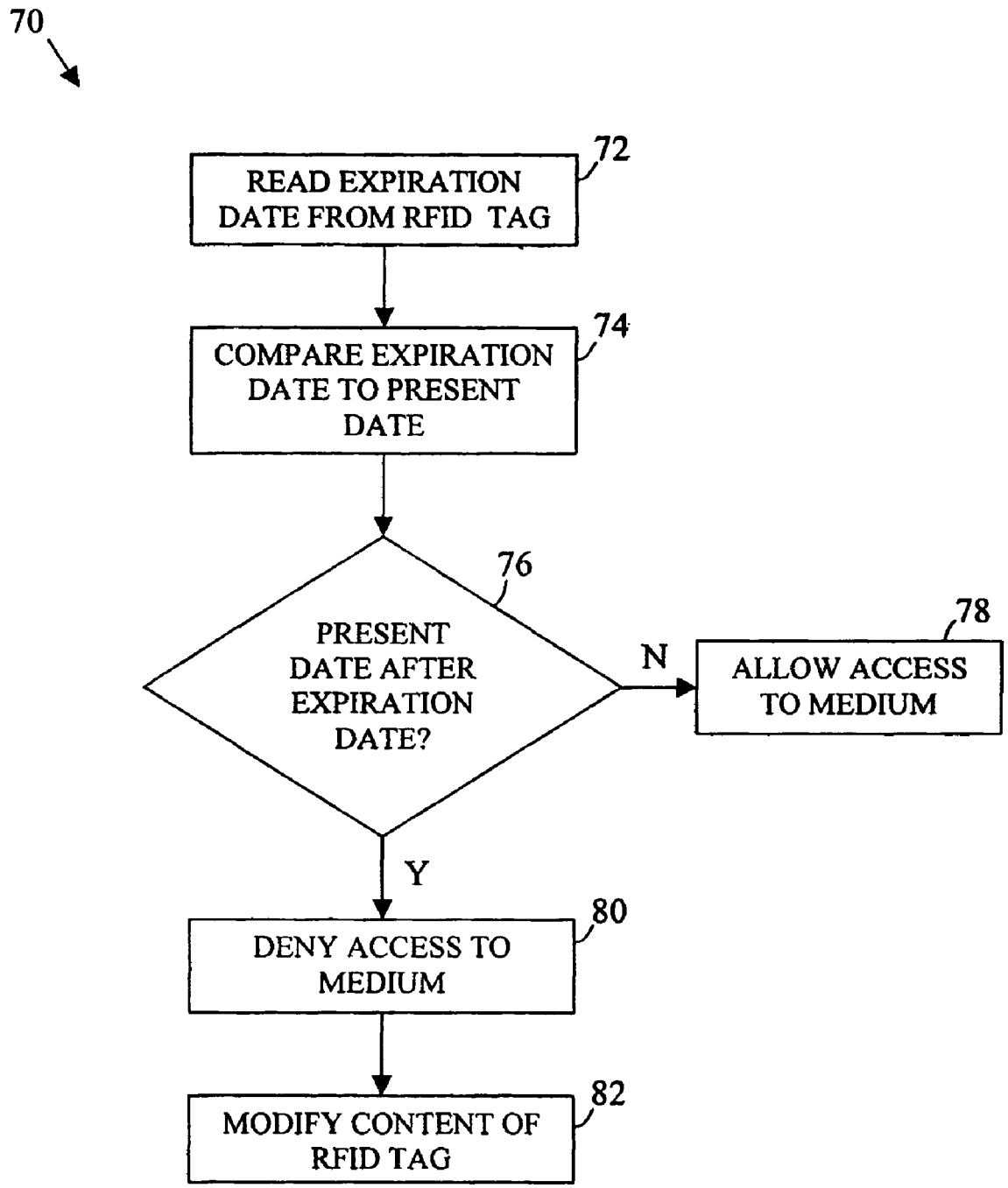
FIG. 5 is a flowchart illustrating an example method for use in implementing a checkout time limitation function for a digital storage medium in accordance with an embodiment of the present invention.

FIG. 5 is a flowchart illustrating an example method 70 for use in implementing a check out time limitation function for a digital storage medium in accordance with an embodiment of the present invention. Before data is accessed from the digital storage medium, an expiration date is read from an RFID tag associated with the medium (block 72). The expiration date may then be compared to a present date (block 74). The present date may be determined by, for example, consulting a clock/calendar function within the system attempting to access the digital storage medium. If the present date is not after the expiration date, access to the medium will be granted (blocks 76N, 78). If the present date is after the expiration date, on the other hand, access to the medium will be denied (blocks 76Y, 80). The contents of the RFID tag may then be modified to reflect the fact that access rights to the digital storage medium have expired (block 82). For example, in one implementation, a decryption key stored within the RFID tag may be deleted at this point. In another implementation, a status bit within the RFID tag may be toggled to a "locked" status. Other techniques for modifying the RFID tag content when it is determined that an expiration date has passed may alternatively be used. In at least one embodiment, the contents of the RFID tag are not modified after the expiration date.

Figure 6:
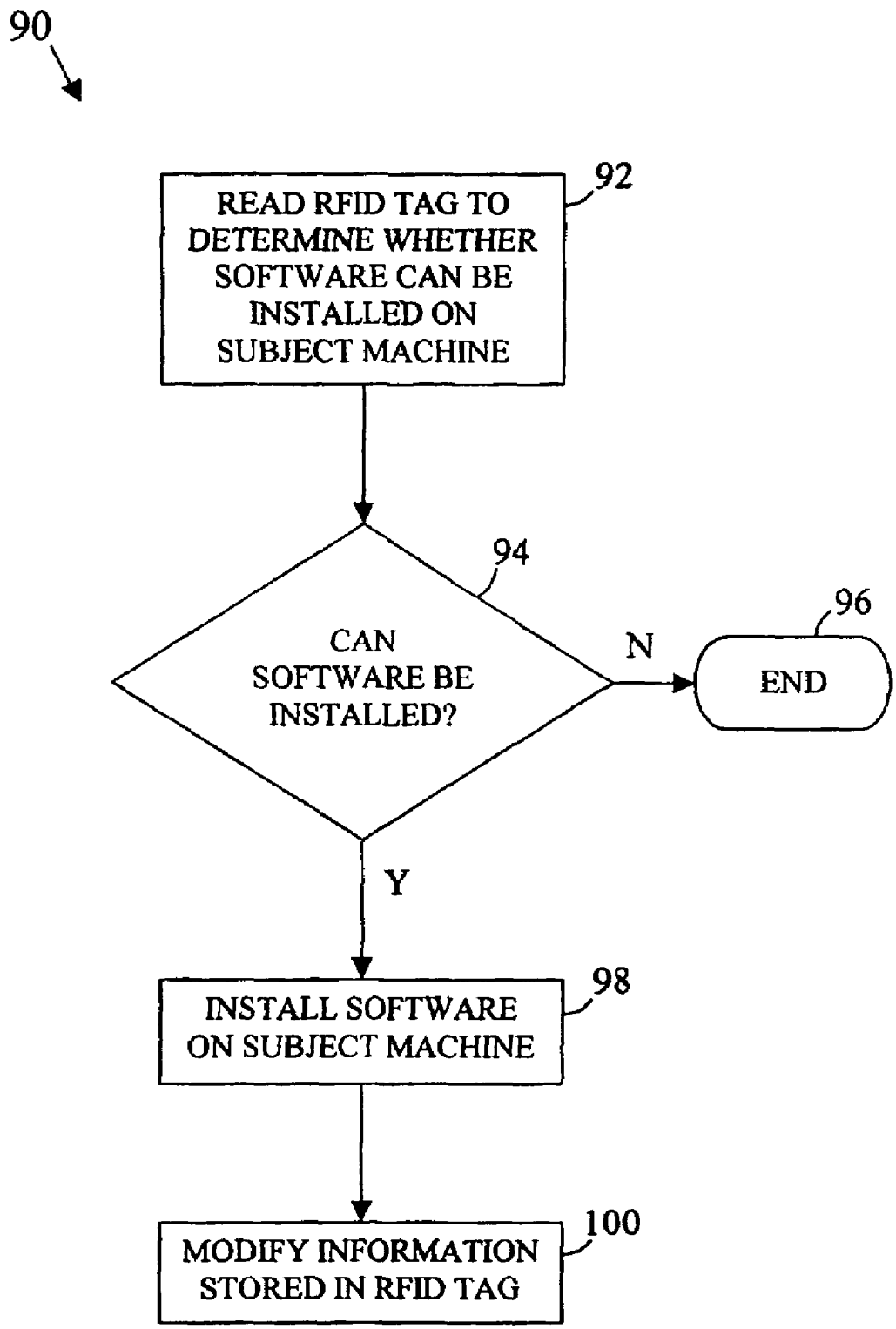
FIG. 6 is a flowchart illustrating an example method for use in managing the installation of commercial software within a host system in accordance with an embodiment of the present invention.

FIG. 6 is a flowchart illustrating an example method 90 for use in managing the installation of commercial software within a host system in accordance with an embodiment of the present invention. An RFID associated with a digital storage medium carrying the software is first read to determine whether it is permissible to install the software on the subject machine (block 92). For example, the RFID tag content may indicate that the software was already installed on another machine and thus may not be installed on the present machine. Conversely, the RFID tag content may indicate that the software has not been installed on another machine or that the software was installed on another machine but the license allows it to be installed on at least one other machine, etc. If it is determined that the software cannot be installed on the subject machine, the method 90 terminates (block 94N, 96). If it is determined that the software can be installed on the subject machine, the software is installed (block 94Y, 98). After the software has been installed, the contents of the RFID tag may be modified to reflect the installation (block 100). For example, in one approach, an identifier of the subject machine (and possibly other information) may be entered into the RFID tag after installation. Other techniques may alternatively be used.

The methods illustrated in FIGS. 4, 5, and 6 may be executed, for example, by control functionality within the systems that are attempting to access the corresponding digital storage media (e.g., controller 48 of FIG. 3, etc.). In one possible form, the methods may be stored as instructions and/or data structures on machine readable media. Examples of different types of machine readable media that may be used include floppy diskettes, hard disks, optical disks, compact disc read only memories (CD-ROMs), DVDs, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In another form, the inventive techniques are embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An article comprising:
a storage medium to store digital data; and
a radio frequency identification (RFID) tag coupled to said storage medium to store information for use in accessing digital data stored on said storage medium;
wherein said information stored on said RFID tag includes a decryption key for use in decrypting digital data stored on said storage medium.

2. The article of claim 1, wherein:
said storage medium includes a disk; and
said RFID tag is coupled to a surface of said disk.

3. The article of claim 1, wherein:
said storage medium includes an optical disk; and
said RFID tag is coupled to a surface of said optical disk.

4. The article of claim 3, wherein:
said optical disk includes a metallic layer covering a data recording region thereof and antenna traces deposited on a common surface of said disk, said RFID tag being electrically connected to said antenna traces, wherein said metallic layer and said antenna traces are formed from the same metallic material.

5. The article of claim 1, wherein:
said information includes rules indicating how said digital data stored on said storage medium can be used.

6. The article of claim 1, wherein:
said information includes expiration information indicating a time after which said digital data stored on said storage medium will no longer be accessible.

7. The article of claim 1, wherein:
said digital data stored on said storage medium includes software; and
said information includes an indication of whether said software has already been installed on a computer.

8. A system comprising:
a radio frequency identification (RFID) tag reader to read information from an RFID tag associated with a digital storage medium;
a medium reading subsystem to read data from said digital storage medium; and
a controller to receive said information read from said RFID tag and to use said information during an access operation involving said digital storage medium;
wherein said information includes an expiration date and said controller is to deny access to said data on said digital storage medium after said expiration date has passed.

9. The system of claim 8, wherein:
said digital storage medium includes an optical disk.

10. The system of claim 8, wherein:
said information includes a decryption key; and
said controller to use said decryption key to decrypt data read from said digital storage medium.

11. The system of claim 8, wherein:
said data stored on said digital storage medium includes software; and
said controller does not allow said software to be installed in said system when said information read from said RFID tag indicates that said software is not permitted to be installed in said system.

12. The system of claim 11, wherein:
said controller does not allow said software to be installed in said system when said information read from said RFID tag indicates that said software has already been installed within another system.

13. The system of claim 8, wherein:
said information includes a decryption key to decrypt data read from said digital storage medium; and
said controller is to delete said decryption key from said RFID tag after said expiration date has passed.

14. The system of claim 8, wherein:
said controller to modify said data stored in said RFID tag after said expiration date has passed.

15. A method comprising:
reading information from an RFID tag coupled to a digital storage medium; and
using said information during an access operation of said digital storage medium to control access to data stored on said digital storage medium;
wherein said digital storage medium has software stored thereon and using said information includes determining whether said software can be installed on a subject computer based on said information and installing said software on said subject computer when it is permissible to do so.

16. The method of claim 15, wherein:
said digital storage medium includes an optical disk.

17. The method of claim 15, wherein:
said information includes a decryption key; and
using said information includes using said decryption key to decrypt data stored on said digital storage medium.

18. The method of claim 15, wherein:
said information includes an expiration date; and
using said information includes comparing said expiration date to a present date and denying access to said digital storage medium when said expiration date is earlier than said present date.

19. The method of claim 15, further comprising:
after installing said software on said subject computer, writing information to said RFID tag indicating that said software has been installed on a computer.

20. An article comprising a storage medium having instructions stored thereon that, when executed by a computing platform, operate to:
read information from an RFID tag coupled to a digital storage medium; and use said information during an access operation of said digital storage medium to control access to data stored on said digital storage medium;

wherein said information includes a decryption key for use in decrypting digital data stored on said storage medium.

21. The article of claim 20, wherein:
said digital storage medium includes an optical disk.

22. The article of claim 20, wherein:
said information includes an expiration date; and
operation to use said information includes operation to compare said expiration date to a present date and deny access to said digital storage medium when said expiration date is earlier than said present date.

23. The article of claim 20, wherein:
said digital storage medium has software stored thereon; and
operation to use said information includes operation to determine whether said software can be installed on a subject computer based on said information and operation to install said software on said subject computer when it is permissible to do so.

24. The method of claim 19, further comprising:
after installing said software on said subject computer, writing an identifier identifying said subject computer to said RFID tag.

\* \* \* \* \*